UNITED STATES PATENT OFFICE 2,112,599

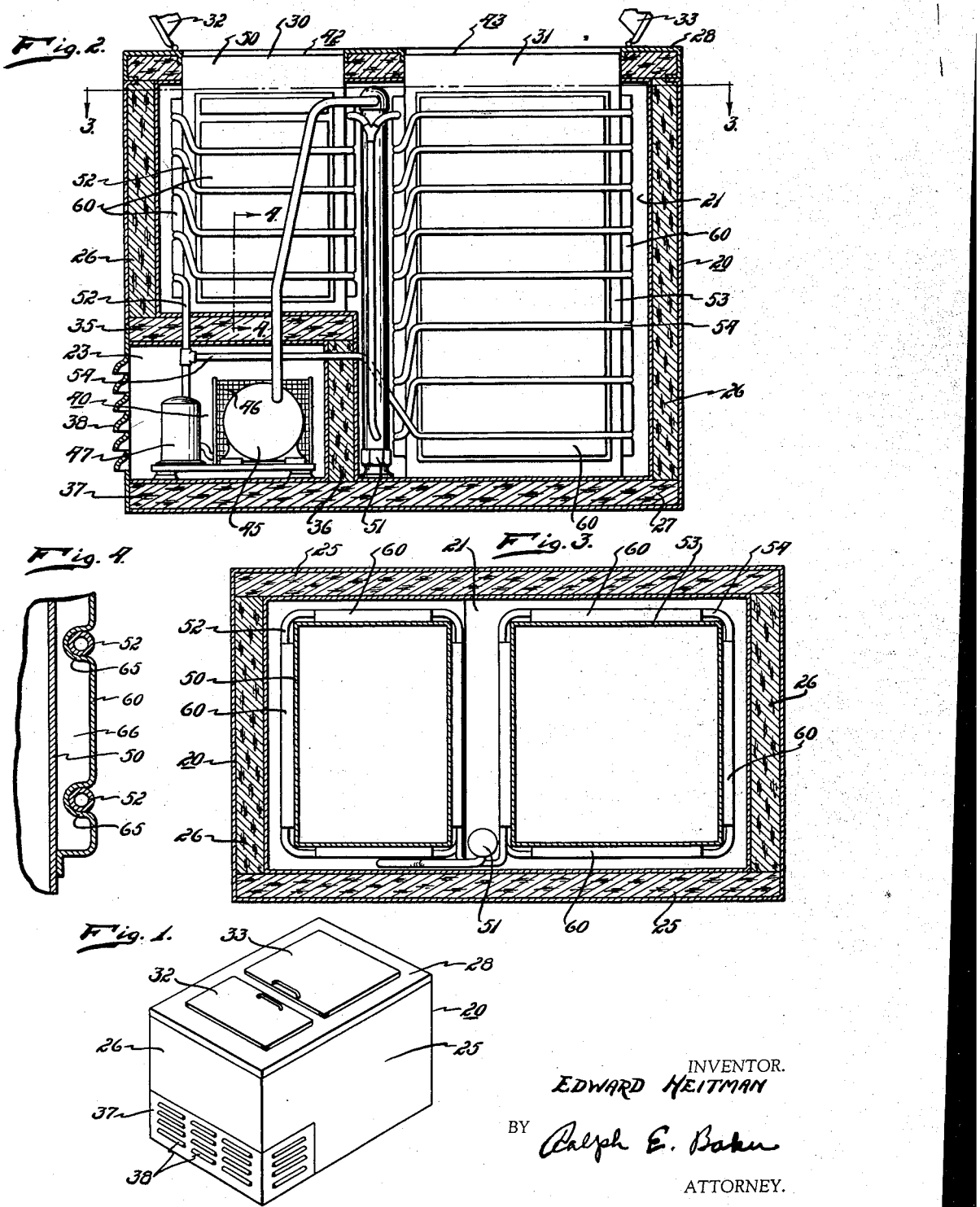

REFRIGERATING APPARATUS

Edward Heitman, Detroit, Mich., assignor, by mesne assignments, to Nash-Kelvinator Corporation, Detroit, Mich., a corporation of Maryland Original application July 11, 1932, Serial No. 621,895. Divided and this application January 11, 1934, Serial No. 706,174

1 Claim. (Cl. 62—116)

This invention relates to refrigerating apparatus.

This application is a division of my co-pending application, Serial No. 621,895, filed July 11, 1932, for "Refrigerating apparatus", now matured into Patent No. 2,012,308, issued Aug. 27, 1935.

One of the objects of the invention is to provide a new and improved arrangement of a refrigerating system within a cabinet.

Another object of the invention is to provide a portable refrigerating apparatus having a cabinet within which a refrigerating system is compactly arranged in a manner so as to utilize a maximum of cabinet space for the storage of foods.

Other objects and advantages of the present invention will be readily apparent from the following description and by reference to the accompanying drawing.

In the drawing:

Fig. 1 is a view shown in perspective of a refrigerating apparatus embodying features of my invention;

Fig. 2 is a side view shown partly in cross section and partly in elevation of the refrigerating apparatus embodying features of my invention;

Fig. 3 is a view taken in the direction of line 3—3 of Fig. 2; and

Fig. 4 is an enlarged fragmentary view in cross section, taken along the line 4—4 of Fig. 2.

Referring to the drawing, numeral 20 designates, in general, a substantially rectangular shaped refrigerator cabinet having a refrigerating compartment 21 and a machine compartment 23. The cabinet is constructed of insulated walls including side walls 25, end walls 26, a bottom wall 27 and a removable top wall 28. The top wall 28 is provided in this instance with two substantially rectangular openings 30 and 31 leading into the compartment 21. Movable closure members 32 and 33 are provided for closing the openings and as shown are hinged so as to swing open in opposite directions.

The machine compartment 23 preferably occupies a portion of the space at the bottom of the cabinet 20 and at one end thereof. A horizontally extending insulated wall 35 and a vertically extending insulated wall 36 are arranged within the cabinet to cooperate with one another and with the bottom, end and side walls of the cabinet to provide the machine compartment 23. As shown in Fig. 2, the horizontally disposed bottom wall 27 of the cabinet serves as the bottom wall of the machine compartment 23 and of the compartment 21. The side and end walls of the machine compartment are formed by a removable closure member 37 in which louvered openings 38 are provided to admit air to the machine compartment. Thus, within the confines of a symmetrically shaped cabinet are provided the compartments 21 and 23 insulated from one another.

A refrigerating system is arranged within the cabinet and comprises, in general, a refrigerant condensing element 40 disposed within the machine compartment 23 and two cool storage receptacles 42 and 43 disposed within compartment 21. While two of such cooling elements are shown, it will be understood that the cabinet may be made larger to accommodate three or more cooling elements if desired.

In order to utilize all of the available cabinet space for cooling purposes and to also provide a neat and compact apparatus, the storage receptacle 42 is made smaller than the receptacle 43 so that it may occupy the offset space within compartment 21 above the machine compartment 23 as shown. The receptacle 42 may be supported on the horizontal wall 35. The large receptacle 43 extends the full depth of the compartment 21 and is supported on the bottom wall 27 of the cabinet.

The refrigerant condensing element 40 comprises, in general, a motor-compressor unit preferably enclosed in a sealed casing 45, a condenser 46, and a high side float mechanism 47 arranged within the machine compartment in the same vertical plane with the cooling element 42 and supported on the bottom wall 27. The condenser is preferably air cooled and for this purpose a fan (not shown) driven by the motor-compressor unit is provided. This fan also circulates air within the machine compartment 23 to remove heat generated therewithin.

The storage receptacle 42 comprises, in general, a sleeve member 50 and an encircling, refrigerant vaporizing conduit 52. Likewise the large receptacle 43 comprises, in general, a sleeve member 53 and an encircling, refrigerant evaporating conduit 54. Liquid refrigerant is supplied to the conduits 52 and 54 from the high side float mechanism 47, and the refrigerant circulates through the conduits and evaporates therein during which process heat is absorbed from within and about the sleeves 50 and 53. After circulating about the sleeves 50 and 53, the conduits terminate in a refrigerant accumulator 51 disposed within the cabinet.

The sleeves 50 and 53 are preferably formed of sheet metal and substantially rectangular in shape. Within the sleeves, ice cream, desserts, package goods and the like may be stored to be kept at low temperature. The top portions of the sleeves 50 and 53 extend part way into the rectangular openings 30 and 31 in the top removable wall 28 to prevent air from entering the compartment 21 when the doors 32 and 33 are opened.

In order to obtain the desired temperature within the food compartment with a minimum of work done by the motor-compressor unit and to also provide for retaining said temperature for a considerable period of time in case the motor-compressor becomes inoperative due to failure of the electric current, I provide chambers on the outer side walls of the sleeves for containing a heat retaining medium. These chambers are provided for both cooling elements, the parts and construction being similar, so that a description of one of the cooling elements is deemed sufficient. Referring to the cooling element 42, a plurality of pan-shaped members 60, preferably formed of sheet metal, is secured to the outer side walls of the sleeve 50, such as by welding. Each of these pan-shaped members is provided on its outer surface with a plurality of indented or bent portions 65. Thus, when the pan-shaped members are secured to the sleeve, they cooperate therewith to form chambers 66. The pan-shaped members are securely welded about the edges to the sleeves to provide the chambers 66 fluid tight.

The heat retaining medium is contained within the chambers 66 and may be of any suitable eutectic or cryohydrate mixture having the characteristic of retaining heat for considerable periods of time. Disposed within the indented portions and in good thermal contact with the heat retaining medium is the refrigerant conduit 52. Thus, during the process of evaporation of the refrigerant in the conduit 52, heat is absorbed from the food compartment and from the eutectic or cryohydrate mixture so that if the electric current fails, the sleeves and compartment 21 will be kept at a low temperature for a considerable period of time by the heat retaining medium. With this construction it will also be seen that the conduit 52 may be easily assembled with or disassembled from the sleeve.

Preferably the system is intermittently operated for maintaining substantially constant temperatures in the food storage chambers. Any suitable means, such as a thermostat (not shown) responsive to changes in temperature in the food storage chambers, may be used for connecting or disconnecting the electric motor to the source of supply. On the off-phase of the system the temperature within the food compartments will be maintained for a considerable period of time by the eutectic mixture in the chambers 66. Consequently, the food storage chambers are maintained at the desired temperature with a minimum of work done by the motor-compressor unit, resulting in an economically operated system.

In operation, gaseous refrigerant is withdrawn from the top of the refrigerant accumulator 51 by the compressor, which compresses the gas and delivers it to the condenser to be liquefied. The liquid refrigerant is then delivered to the high side float mechanism 47 and from here is delivered to the conduits 52 and 54 to be again circulated thereabout and evaporated.

From the foregoing description, it will be seen that I have provided a new and improved arrangement of refrigerating units within a cabinet so as to utilize the maximum of available cabinet space for cooling elements, having sleeves for storing food. It will also be appreciated that this has been accomplished within a neat and symmetrically shaped cabinet. Moreover, I have provided a new and improved type of cooling element in which a sleeve for storing food is provided with a plurality of chambers for a heat retaining medium, and a refrigerant circulating conduit is arranged in good thermal contact with the heat retaining medium, increasing the efficiency of the apparatus as a whole. By the arrangement of the conduit and the sleeve, not only a more efficient apparatus results, but the manufacture and assembly of the conduit and sleeve is facilitated.

Although only a preferred form of the invention has been illustrated, and that form described in detail, it will be apparent to those skilled in the art that various modifications may be made therein without departing from the spirit of the invention or from the scope of the appended claim.

What I claim is:

Refrigerating apparatus comprising a cabinet of the portable type having two compartments of different sizes and in open communication, two refrigerant evaporating elements connected in parallel and being arranged adjacent each other between the compartments and about the walls of each compartment so that each cools a separate compartment, means for delivering liquid refrigerant directly to the inlet of each evaporating element, a refrigerant accumulator associated with the outlets only of said evaporating elements and means for conducting and withdrawing vaporized refrigerant from the upper part of said accumulator.

EDWARD HEITMAN.